(12) United States Patent
Lee et al.

(10) Patent No.: US 11,809,341 B2
(45) Date of Patent: Nov. 7, 2023

(54) SYSTEM, DEVICE AND METHOD FOR INDIRECT ADDRESSING

(71) Applicant: SAMSUNG ELECTRONICS CO., LTD., Suwon-si (KR)

(72) Inventors: Jeongho Lee, Gwacheon-si (KR); Ipoom Jeong, Hwaseong-si (KR); Younggeon Yoo, Seoul (KR); Younho Jeon, Gimhae-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/378,354

(22) Filed: Jul. 16, 2021

(65) Prior Publication Data
US 2022/0114118 A1 Apr. 14, 2022

(30) Foreign Application Priority Data
Oct. 14, 2020 (KR) .................. 10-2020-0132978

(51) Int. Cl.
*G06F 13/16* (2006.01)
*G06F 3/06* (2006.01)

(52) U.S. Cl.
CPC .......... *G06F 13/1668* (2013.01); *G06F 3/061* (2013.01); *G06F 3/065* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,522,061 A * | 5/1996 | Burgoon ............... | G06F 13/385 711/169 |
| 8,166,277 B2 | 4/2012 | Arimilli et al. | |
| 8,352,686 B2 | 1/2013 | Ju | |
| 8,880,815 B2 | 11/2014 | Alexandron et al. | |
| 9,619,405 B2 | 4/2017 | Atzmon et al. | |
| 2006/0004975 A1* | 1/2006 | Matheny ................. | G06F 9/342 711/202 |
| 2009/0138661 A1 | 5/2009 | Lauterbach | |
| 2011/0302213 A1* | 12/2011 | Noguchi ................. | G06F 16/10 707/E17.012 |
| 2017/0177346 A1 | 6/2017 | Gokhale et al. | |

(Continued)

OTHER PUBLICATIONS

Communication dated Jan. 21, 2022 issued by the European Patent Office in European Application No. 21187355.9.

(Continued)

*Primary Examiner* — Farley Abad
*Assistant Examiner* — Dayton Lewis-Taylor
(74) *Attorney, Agent, or Firm* — Sughrue Mion, PLLC

(57) ABSTRACT

A method performed by a device connected to a host processor via a bus includes: providing a first read request including a first address to a memory; receiving a second address stored in a first region of the memory corresponding to the first address, from the memory; providing a second read request including the second address to the memory; and receiving first data stored in a second region of the memory corresponding to the second address, from the memory, wherein the first read request further includes information indicating that the first address is an indirect address of the first data.

18 Claims, 13 Drawing Sheets

(56) References Cited

U.S. PATENT DOCUMENTS

| | | | |
|---|---|---|---|
| 2018/0107614 A1* | 4/2018 | Hong | .................. G06F 13/1642 |
| 2019/0278601 A1* | 9/2019 | Emma | ....................... G06F 9/35 |
| 2019/0324914 A1 | 10/2019 | Xiao et al. | |
| 2020/0012604 A1 | 1/2020 | Agarwal | |
| 2020/0110705 A1 | 4/2020 | Jo et al. | |
| 2020/0125503 A1 | 4/2020 | Graniello et al. | |

OTHER PUBLICATIONS

Arnold, M., et al., "Method of Indirect Data Addressing", ip.com, ip.com Inc., Feb. 1, 1994, vol. 37, No. 02B, 3 pages, XP013099392.

\* cited by examiner

SYSTEM, DEVICE AND METHOD FOR INDIRECT ADDRESSING

CROSS-REFERENCE TO RELATED APPLICATION

This application is based on and claims priority under 35 U.S.C. § 119 to Korean Patent Application No. 10-2020-0132978, filed on Oct. 14, 2020, in the Korean Intellectual Property Office, the disclosure of which is incorporated by reference herein in its entirety.

BACKGROUND

Example embodiments of the present disclosure relate to memory access, and more particularly, to a system, device, and method for indirect addressing.

An apparatus configured to process data may perform various operations by accessing a memory. For example, an apparatus may process data read from a memory or write processed data to a memory. Due to the performance and functions required of a system, various apparatuses that communicate with each other via a link providing a high bandwidth and low latency may be included in the system. A memory included in the system may be shared and accessed by two or more apparatuses. Accordingly, system performance may be dependent not only on an operational speed of each apparatus but also on communication efficiency among apparatuses and time needed for memory access.

SUMMARY

Example embodiments provide a system, device, and method for a reduced latency of memory access.

According to an aspect of an example embodiment, there is provided a memory controller configured to control a memory accessed by a device connected to a host processor via a bus, the memory controller including: a first interface circuit configured to communicate with the device; a second interface circuit configured to communicate with the memory; and a read circuit configured to identify that a first address included in a first read request received via the first interface circuit is an indirect address of first data, based on first information included in the first read request, read a second address from a first region of the memory corresponding to the first address via the second interface circuit, and prefetch the first data from a second region of the memory corresponding to the second address via the second interface circuit.

According to an aspect of an example embodiment, there is provided a system including: a host processor including at least one core configured to execute instructions; a device connected to the host processor via a bus and including an accelerator circuit and a memory controller; and a memory configured to be accessed by the accelerator circuit via the memory controller, wherein the accelerator circuit is configured to provide a first read request including an indirect address of first data stored in the memory, to the memory controller, and the memory controller is further configured to identify the indirect address of the first data based on first information included in the first read request, read a direct address of the first data from a first region of the memory corresponding to the indirect address of the first data, and prefetch the first data from a second region of the memory corresponding to the direct address.

According to an aspect of an example embodiment, there is provided a method performed by a device connected to a host processor via a bus, the method including: providing a first read request including a first address to a memory; receiving a second address stored in a first region of the memory corresponding to the first address, from the memory; providing a second read request including the second address to the memory; and receiving first data stored in a second region of the memory corresponding to the second address, from the memory, wherein the first read request further includes first information indicating that the first address is an indirect address of the first data.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
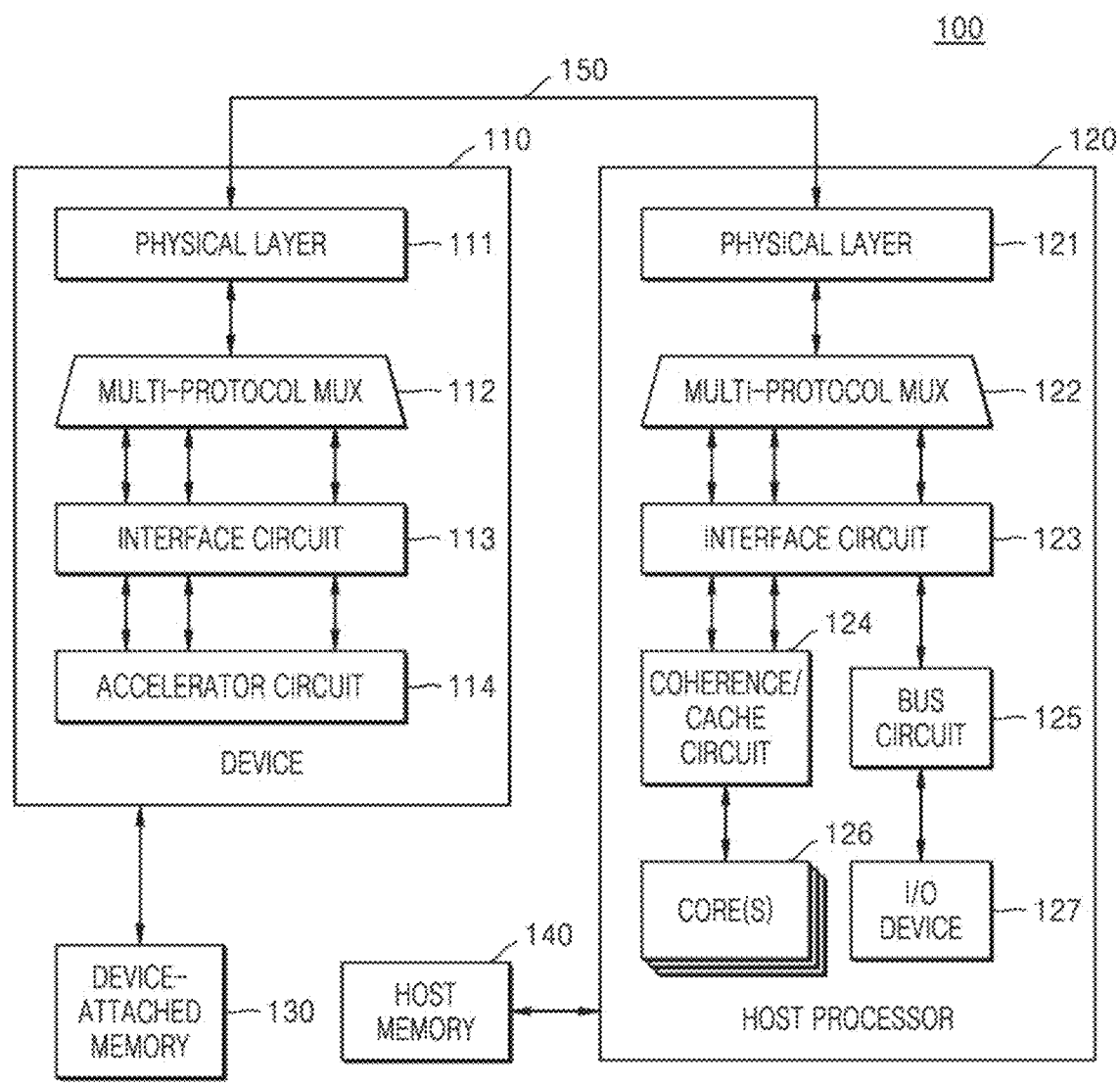
FIG. 1 is a block diagram illustrating a system according to an example embodiment.

FIG. 1 is a block diagram illustrating a system 100 according to an example embodiment. The system 100 may be an arbitrary computing system (or a component included in a computing system) including a device 110 and a host processor 120 that communicate with each other. For example, the system 100 may be included in a stationary computing system such as a desktop computer, a server, or a kiosk, or in a portable computing system such as a laptop computer, a mobile phone, or a wearable device. Also, in some embodiments, the system 100 may be included in a system-on-chip (SoC) or a system-in-package (SiP) in which the device 110 and the host processor 120 are implemented in a single chip or package. As illustrated in FIG. 1, the system 100 may include the device 110, the host processor 120, a device-attached memory 130, and a host memory 140. In some embodiments, the device-attached memory 130 may be omitted from the system 100.

Referring to FIG. 1, the device 110 and the host processor 120 may communicate with each other via a link 150, and may transmit or receive a message and/or data to or from each other via the link 150. Example embodiments will be described with reference to the link 150 based on Computer Express Link (CXL) specifications supporting CXL protocols, but the device 110 and the host processor 120 may also communicate with each other based on coherent interconnect techniques such as an Xbus protocol, an NVLink protocol, an Infinity Fabric protocol, a cache coherent interconnect for accelerators (CCIX) protocol, or a coherent accelerator processor interface (CAPI) protocol.

In some embodiments, the link 150 may support multiple protocols, and a message and/or data may be transmitted via the multiple protocols. For example, the link 150 may support CXL protocols including non-coherent protocols (e.g., CXL.io), coherent protocols (e.g., CXL.cache), and memory access protocols (or memory protocol) (e.g., CXL.mem). In some embodiments, as an unlimited example, the link 150 may also support protocols such as peripheral component interconnect (PCI), PCI express (PCIe), universal serial bus (USB), or serial advanced technology attachment (SATA). Herein, protocols supported by the link 150 may be referred to as interconnect protocols.

The device 110 may refer to an arbitrary device providing useful functions to the host processor 120, and may correspond to an accelerator of CXL specifications in some embodiments. For example, software executed on the host processor 120 may offload at least a portion of computing and/or input/output (I/O) operations onto the device 110. In some embodiments, the device 110 may include at least one of a programmable component such as a graphics processing unit (GPU) or a neural processing unit (NPU), a component providing a fixed function such as an intellectual property (IP) core, and a reconfigurable component such as a field programmable gate array (FPGA). As illustrated in FIG. 1, the device 110 may include a physical layer 111, a multi-protocol multiplexer 112, an interface circuit 113, and an accelerator circuit 114, and communicate with the device-attached memory 130.

The accelerator circuit 114 may perform useful functions provided by the device 110 to the host processor 120, and may also be referred to as accelerator logic. As illustrated in FIG. 1, when the device-attached memory 130 is included in the system 100, the accelerator circuit 114 may communicate with the device-attached memory 130 based on a protocol that is independent from the link 150, that is, a device-specific protocol. Also, as illustrated in FIG. 1, the accelerator circuit 114 may communicate with the host processor 120 via the interface circuit 113 by using multiple protocols.

The interface circuit 113 may determine one of the multiple protocols based on a message and/or data for communication between the accelerator circuit 114 and the host processor 120. The interface circuit 113 may be connected to at least one protocol queue included in the multi-protocol multiplexer 112, and transmit or receive a message and/or data to or from the host processor 120 via the at least one protocol queue. In some embodiments, the interface circuit 113 and the multi-protocol multiplexer 112 may be integrated as a single component. In some embodiments, the multi-protocol multiplexer 112 may include multiple protocol queues respectively corresponding to multiple protocols supported by the link 150. Also, in some embodiments, the multi-protocol multiplexer 112 may perform arbitration between communications each corresponding to different protocols, and provide selected communications to the physical layer 111. In some embodiments, the physical layer 111 may be connected to a physical layer 121 of the host processor 120 via a single interconnection, a bus, a trace, or the like.

The host processor 120 may be a main processor of the system 100, for example, a central processing unit (CPU), and may correspond to a host processor (or a host) of CXL specifications in some embodiments. As illustrated in FIG. 1, the host processor 120 may be connected to the host memory 140, and may include the physical layer 121, a multi-protocol multiplexer 122, an interface circuit 123, a coherence/cache circuit 124, a bus circuit 125, at least one core 126, and an input/output (I/O) device 127.

The at least one core 126 may execute an instruction, and may be connected to the coherence/cache circuit 124. The coherence/cache circuit 124 may include a cache hierarchy, and may also be referred to as coherence/cache logic. As illustrated in FIG. 1, the coherence/cache circuit 124 may communicate with the at least one core 126 and the interface circuit 123. For example, the coherence/cache circuit 124 may enable communication via two or more protocols including a coherent protocol and a memory access protocol. In some embodiments, the coherence/cache circuit 124 may also include a direct memory access (DMA) circuit. The input/output device 127 may be used to communicate with the bus circuit 125. For example, the bus circuit 125 may be a PCIe logic, and the input/output device 127 may be a PCIe input/output device.

The interface circuit 123 may enable communication between the device 110 and components of the host processor 120, for example, the coherence/cache circuit 124 and the bus circuit 125. In some embodiments, the interface circuit 123 may enable communication of a message and/or data between the components of the host processor 120 and the device 110 according to multiple protocols, for example, a non-coherent protocol, a coherent protocol, and a memory protocol. For example, the interface circuit 123 may determine one of multiple protocols based on a message and/or data for communication between components of the host processor 120 and the device 110.

The multi-protocol multiplexer 122 may include at least one protocol queue. The interface circuit 123 may be connected to the at least one protocol queue, and may transmit or receive a message and/or data to or from the device 110 via the at least one protocol queue. In some embodiments, the interface circuit 123 and the multi-protocol multiplexer 122 may be integrated as a single component. In some embodiments, the multi-protocol multiplexer 122 may include multiple protocol queues respectively corresponding to multiple protocols supported by the link 150. Also, in some embodiments, the multi-protocol multiplexer 122 may perform arbitration between communications each corresponding different protocols, and provide selected communications to the physical layer 121.

In some embodiments, the host processor 120 may execute hierarchical software including an operating system (OS) and/or applications executed on an OS, and may access the host memory 140 and/or the device-attached memory 130 based on a virtual memory. On the other hand, the accelerator circuit 114 may provide an address to a memory controller for accessing the device-attached memory 130, and provide a message, which includes an address for accessing the host memory 140 or another memory connected to the link 150, via the link 150. Accordingly, the accelerator circuit 114 may identify an addressing mode used in memory access more easily than the host processor 120. An addressing mode may include direct addressing in which an address of a memory in which data is stored is directly provided to the memory and indirect addressing in which a first address storing a second address is provided to a memory to obtain the second address at which data is stored, and then the second address is provided to the memory. Herein, an address provided to a memory in direct addressing or a second address provided to a memory in indirect addressing may be referred to as a direct address, and a first address provided to a memory in indirect addressing may be referred to as an indirect address.

As will be described later with reference to the drawings, latency of memory access based on indirect addressing of the accelerator circuit 114 may be remarkably reduced by data prefetching. Also, a protocol supported by the link 150 in the system 100 (e.g., a coherent protocol and a memory protocol) may support indirect addressing, and accordingly, the device 110 and other devices included in the system 100 may efficiently perform operations using indirect addressing. As a result, the performance of the system 100 may be improved due to the reduced latency with respect to memory access and increased efficiency of the devices.

Figure 2:
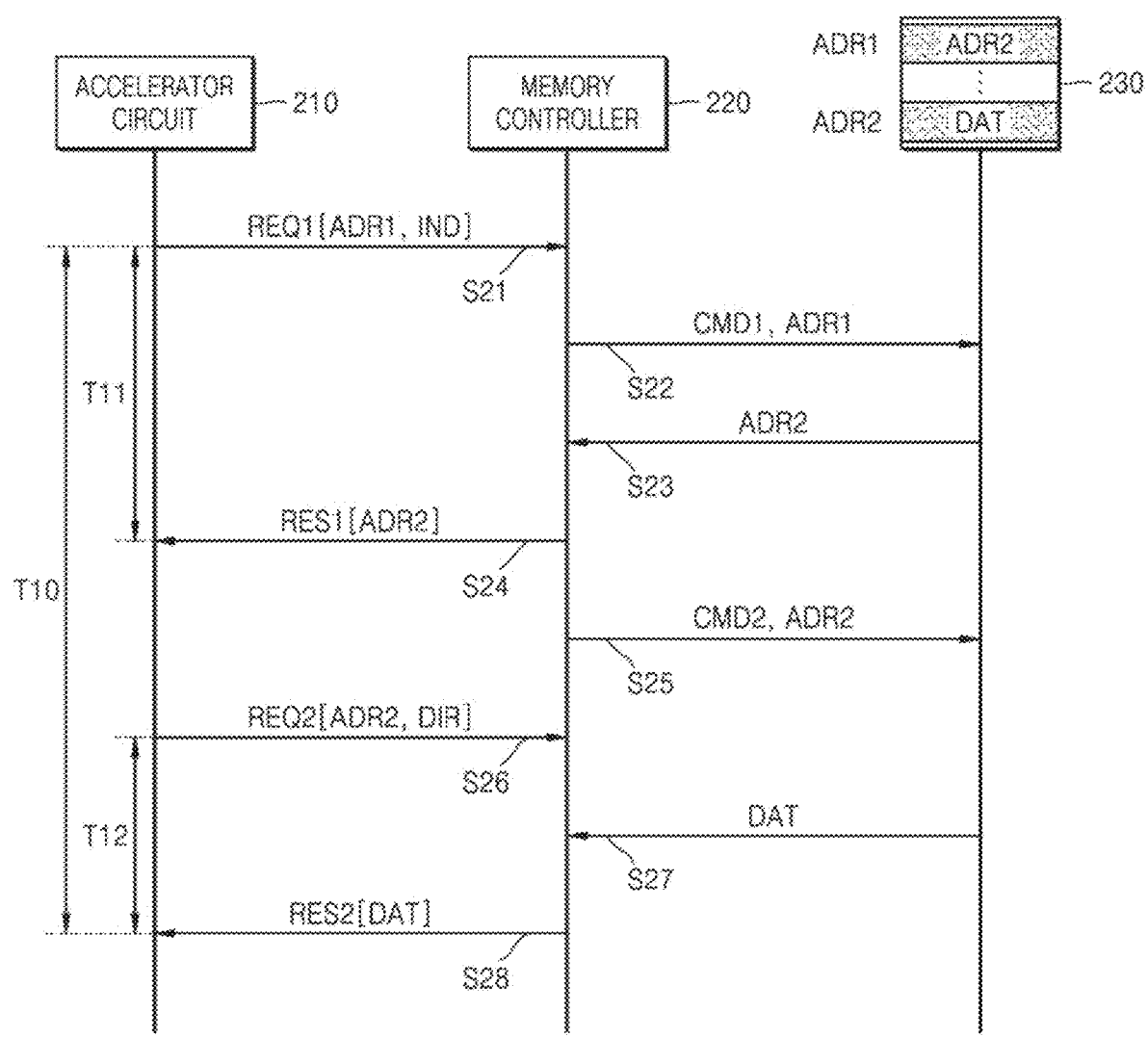
FIG. 2 is a message diagram illustrating a method for indirect addressing according to an example embodiment.

FIG. 2 is a message diagram illustrating a method for indirect addressing according to an example embodiment. In detail, FIG. 2 illustrates a message and/or data transmitted or received among an accelerator circuit 210, a memory controller 220, and a memory 230 with time. As illustrated in FIG. 2, the memory 230 is assumed to be storing a second address ADR2 in a region corresponding to a first address ADR1 and storing data DAT in a region corresponding to the second address ADR2.

In some embodiments, the accelerator circuit 210 of FIG. 2 may correspond to the accelerator circuit 114 of FIG. 1, and the memory controller 220 may provide access to the memory 230. In some embodiments, the memory 230 may be included in the device-attached memory 130 of FIG. 1, and in this case, the memory controller 220 may be included in the device 110 or the device-attached memory 130, and the accelerator circuit 210 and the memory controller 220 may communicate with each other based on a device-specific protocol. Also, in some embodiments, the memory 230 may be included in a remote memory in which the accelerator circuit 114 is accessible via the link 150 (e.g., 140 of FIGS. 1 and 40 of FIG. 11B), and in this case, the memory controller 220 may be included in an apparatus connected to the remote memory or included in the remote memory, and the accelerator circuit 210 and the memory controller 220 may communicate with each other based on a protocol supported by the link 150, for example, a coherent protocol and/or a memory protocol.

Referring to FIG. 2, in operation S21, the accelerator circuit 210 may provide a first read request REQ1 to the memory controller 220. As illustrated in FIG. 2, the first read request REQ1 may include the first address ADR1 and information IND indicating that the first address ADR1 is an indirect address. For example, the accelerator circuit 210 may store data DAT in the memory 230 based on indirect addressing, and then to obtain the data DAT stored in the memory 230, the accelerator circuit 210 may provide, to the memory controller 220, the first read request REQ1 including the first address ADR1 and the information IND indicating that the first address ADR1 is an indirect address.

In operation S22, the memory controller 220 may provide a first read command CMD1 and the first address ADR1 to the memory 230. For example, the memory controller 220 may extract the first address ADR1 from the first read request REQ1, and provide the first read command CMD1 to the memory 230 together with the first address ADR1.

In operation S23, the memory 230 may provide the second address ADR2 to the memory controller 220. For example, in response to the first read command CMD1, the memory 230 may identify the first address ADR1, and provide the second address ADR2 stored in a region corresponding to the first address ADR1, to the memory controller 220.

In operation S24, the memory controller 220 may provide a first response RES1 corresponding to the first read request REQ1, to the accelerator circuit 210. For example, as illustrated in FIG. 2, the memory controller 220 may provide the first response RES1 including the second address ADR2 received from the memory 230 in operation S23, to the accelerator circuit 210.

In operation S25, the memory controller 220 may provide a second read command CMD2 and the second address ADR2 to the memory 230. For example, the memory controller 220 may identify that the first address ADR1 included in the first read request REQ1 is an indirect address based on the information IND included in the first read request REQ1 received in operation S21. As illustrated in FIG. 2, also when no additional read request is issued by the accelerator circuit 210, the memory controller 220 may provide the second read command CMD2 to the memory 230, together with the second address ADR2 received from the memory 230 in operation S23. In some embodiments, unlike FIG. 2, operations S24 and S25 may be performed in parallel, or operations S25 and S24 may be sequentially performed.

In operation S26, the accelerator circuit 210 may provide a second read request REQ2 to the memory controller 220. As illustrated in FIG. 2, the second read request REQ2 may include the second address ADR2 and information DIR indicating that the second address ADR2 is a direct address. For example, the accelerator circuit 210 may extract the second address ADR2 from the first response RES1 received from the memory controller 220 in operation S24, and provide, to the memory controller 220, the second read request REQ2 including the second address ADR2 and the information DIR indicating that the second address ADR2 is a direct address.

In operation S27, the memory 230 may provide the data DAT to the memory controller 220. For example, in response to the second read command CMD2, the memory 230 may identify the second address ADR2, and provide the data DAT stored in a region corresponding to the second address ADR2, to the memory controller 220. In some embodiments, unlike FIG. 2, operations S26 and S27 may be performed in parallel, or operations S27 and S26 may be sequentially performed.

In operation S28, the memory controller 220 may provide a second response RES2 corresponding to the second read request REQ2, to the accelerator circuit 210. For example, as illustrated in FIG. 2, the memory controller 220 may provide the second response RES2 including the data DAT received from the memory 230 in operation S27, to the accelerator circuit 210. As described above, the memory controller 220 may provide the second read command CMD2 to the memory 230 in operation S25 regardless of the second read request REQ2, and may receive the data DAT from the memory 230 at an early stage, and may thus provide the second response RES2 to the accelerator circuit 210 at an early stage. Herein, an operation of receiving, by the memory controller 220, the data DAT from the memory 230 at an early stage based on an indirect address provided by the accelerator circuit 210 may be referred to as prefetching of the data DAT.

A period of time from operation S21 to operation S24, that is, a time period T11 taken by the accelerator circuit 210 to issue the first read request REQ1 and then receive the first response RES1 may include a period of time taken by the memory controller 220 to provide the first read command CMD1 to the memory 230 and receive the second address ADR2 from the memory 230. On the other hand, a period of time taken from operation S26 to operation S28, that is, a time period T12 taken by the accelerator circuit 210 to issue the second read request REQ2 and then receive the second response RES2, may be shorter than the time period T11 from operation S21 to operation S24 due to prefetching of the data DAT by the memory controller 220 (T12<T11). Accordingly, a total period of time taken by the accelerator circuit 210 to obtain the data DAT based on indirect addressing, that is, a time period T10 taken by the accelerator circuit 210 to issue the first read request REQ1 and then receive the second response RES2, may be shortened due to the reduced time period T12, and as a result, access latency with respect to the memory 230 may be reduced.

Figure 3:
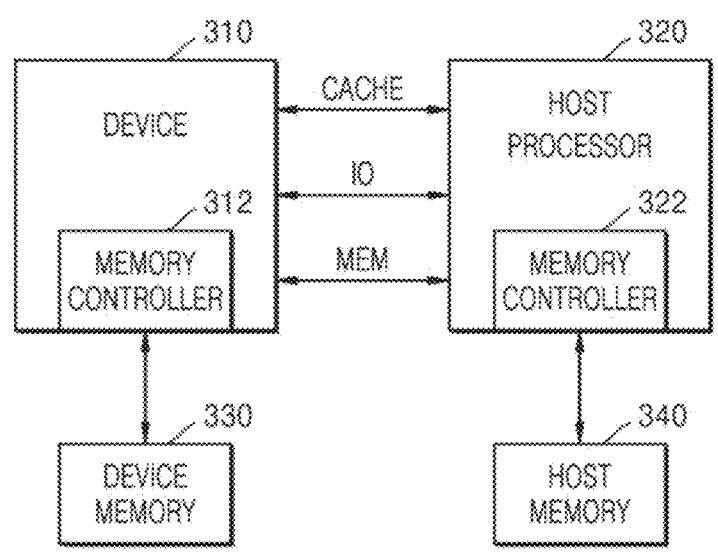
FIG. 3 is a block diagram illustrating a system according to an example embodiment.

FIG. 3 is a block diagram illustrating a system 300 according to an example embodiment. In detail, the block diagram of FIG. 3 illustrates an example of a multi-protocol for communication between a device 310 and a host processor 320. "Multi-protocol" refers to a protocol which has features from two or more protocols. As described above with reference to FIG. 1, the device 310 and the host processor 320 may communicate with each other based on multiple protocols. As illustrated in FIG. 3, the system 300 may include the device 310, the host processor 320, a device memory 330, and a host memory 340. In some embodiments, the device 310 may correspond to a type 2 CXL device defined by the CXL specifications, and the device memory 330 may correspond to the device-attached memory 130 of FIG. 1.

As illustrated in FIG. 3, the multiple protocols may include a memory protocol MEM, a coherent protocol (or cache protocol) CACHE, and a non-coherent protocol IO. In some embodiments, the memory protocol MEM, the coherent protocol CACHE, and the non-coherent protocol IO may respectively correspond to CXL.mem, CXL.cache, and CXL.io. The memory protocol MEM may define transactions between a master and a subordinate. For example, the memory protocol MEM may define a transaction from a master to a subordinate and a transaction from a subordinate to a master. The coherent protocol CACHE may define interactions between the device 310 and the host processor 320. For example, an interface of the coherent protocol CACHE may include three channels including a request, a response, and data. The non-coherent protocol IO may provide a non-coherent load/store interface for input/output devices.

The device 310 may communicate with the device memory 330, and may include a memory controller 312 to access the device memory 330. In some embodiments, unlike FIG. 3, the memory controller 312 may be outside the device 310 or integrated with the device memory 330. Also, the host processor 320 may communicate with the host memory 340, and include a memory controller 322 to access the host memory 340. In some embodiments, unlike FIG. 3, the memory controller 322 may be outside the host processor 320 or integrated with the host memory 340.

The memory controller 312 of the device 310 and the memory controller 322 of the host processor 320 may correspond to the memory controller 220 of FIG. 2. For example, the memory controller 312 of the device 310 may receive a read request with respect to the device memory 330, and may identify that an address included in the read request is an indirect address based on information included in the read request. In some embodiments, the memory controller 312 may receive a read request from an accelerator circuit included in the device 310 and may receive a read request from the host processor 320 or other devices via multiple protocols. Also, the memory controller 322 of the host processor 320 may receive a read request with respect to the host memory 340, and may identify that an address included in the read request is an indirect address based on information included in the read request. In some embodiments, the memory controller 322 may receive a read request from the device 310 via multiple protocols. Accordingly, the multiple protocols may support a message (or a read request) including information indicating an address mode such that the memory controllers 312 and 322 identify an indirect address. Hereinafter, the memory controller 312 included in the device 310 and the device memory 330 communicating therewith will be mainly described, but it should be noted that example embodiments are not limited thereto.

Figure 4:
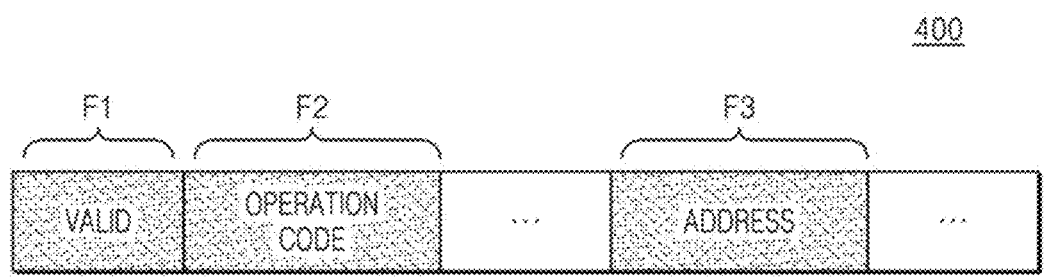
FIG. 4 illustrates a message included in a transaction of a multi-protocol according to an example embodiment.

FIG. 4 illustrates a message 400 included in a transaction of a multi-protocol according to an example embodiment. In some embodiments, the message 400 of FIG. 4 may be defined by the memory protocol MEM and/or the coherent protocol CACHE of FIG. 3. As described above with reference to FIG. 3, in order for a memory controller to identify an indirect address included in a read request, a multi-protocol may support a message including information indicating that an address included in the message is an indirect address (or a direct address).

Referring to FIG. 4, the message 400 may include a first field F1, a second field F2, and a third field F3, and may further include additional fields. Each field included in the message 400 may include at least one bit, and information corresponding to a value of the at least one bit may be defined by a protocol. For example, the first field F1 is a valid signal, and may include one bit indicating that the message 400 is a valid message. The second field F2 is an operation code, and may include a plurality of bits defining an operation corresponding to the message 400. For example, an operation code of the second field F2 may indicate reading or writing with respect to a memory. When the operation code of the second field F2 corresponds to a read operation on a memory, the message 400 may be referred to as a read request; when an operation code of the second field F2 corresponds to a write operation on a memory, the message 400 may be referred to as a write request. The third field F3 is an address, and may include a plurality of bits indicating an address related to an operation code of the second field F2. For example, when an operation code of the second field F2 corresponds to a read operation, the message 400 may be a read request requesting reading of data from a region corresponding to the address of the third field F3. For example, when an operation code of the second field F2 corresponds to a write operation, the message 400 may be a write request requesting writing of data to a region corresponding to the address of the third field F3.

The message 400 may include information indicating that the address of the third field F3 is an indirect address (or a direct address), in various manners. In some embodiments, a protocol may define, in the second field F2, each of a first operation code corresponding to a read request including an indirect address and a second operation code corresponding to a read request including a direct address. For example, when the second field F2 includes the first operation code, the address of the third field F3 may be an indirect address.

In some embodiments, a protocol may define, in the message 400, an additional field including one bit indicating whether the address of the third field F3 is an indirect address or a direct address.

Figure 5:
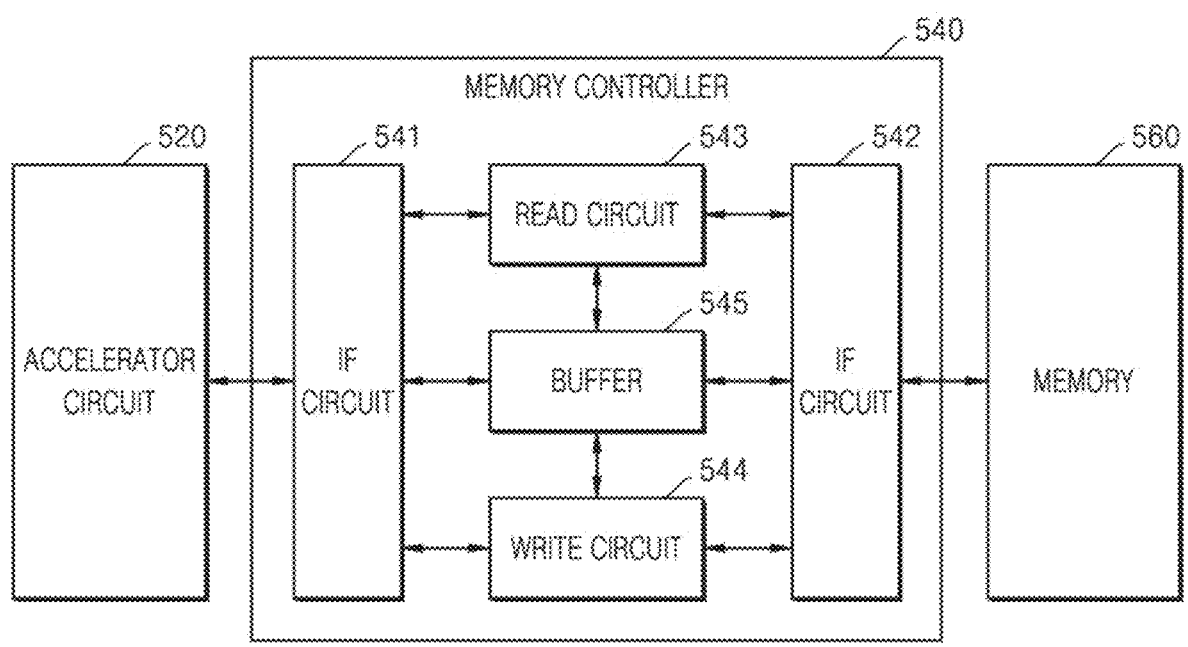
FIG. 5 is a block diagram illustrating a system according to an example embodiment.

FIG. 5 is a block diagram illustrating a system 500 according to an example embodiment. In detail, the block diagram of FIG. 5 illustrates an exemplary structure of a memory controller 540, together with an accelerator circuit 520 and a memory 560. Referring to FIG. 5, the memory controller 540 may include a first interface (IF) circuit 541, a second interface circuit 542, a read circuit 543, a buffer 545, and a write circuit 544.

The first interface circuit 541 and the accelerator circuit 520 may communicate with each other. In some embodiments, when the memory controller 540 is included in a memory device (for example, 130 of FIG. 1 or 330 of FIG. 3), together with the memory 560, the first interface circuit 541 may be described as communicating with a device including the accelerator circuit 520. As described above with reference to FIG. 2, the first interface circuit 541 may receive a request from the accelerator circuit 520 and provide a response to the accelerator circuit 520. In some embodiments, a read request may include an address, and a write request may include an address and data.

The second interface circuit 542 may communicate with the memory 560. The memory 560 may refer to an arbitrary storage medium capable of storing information. For example, the memory 560 may be manufactured in a semiconductor process and may include volatile memory such as static random access memory (SRAM), dynamic random access memory (DRAM), or the like, or a non-volatile memory such as flash memory, resistive random access memory (RRAM), or the like. As described above with reference to FIG. 2, the second interface circuit 542 may provide a command and an address to the memory 560, and receive data from the memory 560. In some embodiments, a read command may be provided to the memory 560 together with an address, and a write command may be provided to the memory 560 together with an address and data.

The read circuit 543 may control an operation of reading data from the memory 560. For example, the read circuit 543 may receive a read request from the accelerator circuit 520 via the first interface circuit 541, and may read data from the memory 560 via the second interface circuit 542 based on an address included in the read request. Also, the write circuit 544 may control an operation of writing data to the memory 560. For example, the write circuit 544 may receive a write request from the accelerator circuit 520 via the first interface circuit 541, and may write data to the memory 560 via the second interface circuit 542 based on an address included in the write request. The buffer 545 may temporarily store data read by the read circuit 543 from the memory 560 or data to be written by the write circuit 544 to the memory 560.

In some embodiments, the read circuit 543 may identify an indirect address based on information included in a read request received via the first interface circuit 541. When an address included in a read request received from the first interface circuit 541 is an indirect address, the read circuit 543 may prefetch data stored in a region of the memory 560 corresponding to the indirect address, that is, data stored in a region of the memory 560 corresponding to the indirect address read from the memory 560, regardless of the read request from the accelerator circuit 520. Data prefetching or data caching may refer to an operation of moving data stored in a remote region from the memory controller 540 to a region in which the data is more quickly accessed. In some embodiments, the read circuit 543 may prefetch data read from the memory 560 by storing the data in the buffer 545 as will be described later with reference to FIG. 7. Also, in some embodiments, the read circuit 543 may prefetch data by copying the data to an upper-level memory in the memory 560 as will be described later with reference to FIG. 8. Accordingly, as described above with reference to FIG. 2, the memory controller 540 may provide a response corresponding to a read request based on indirect addressing, to the accelerator circuit 520, at an early stage. Examples of an operation of the read circuit 543 will be described by referring to FIGS. 6 and 10 or the like.

Figure 6:
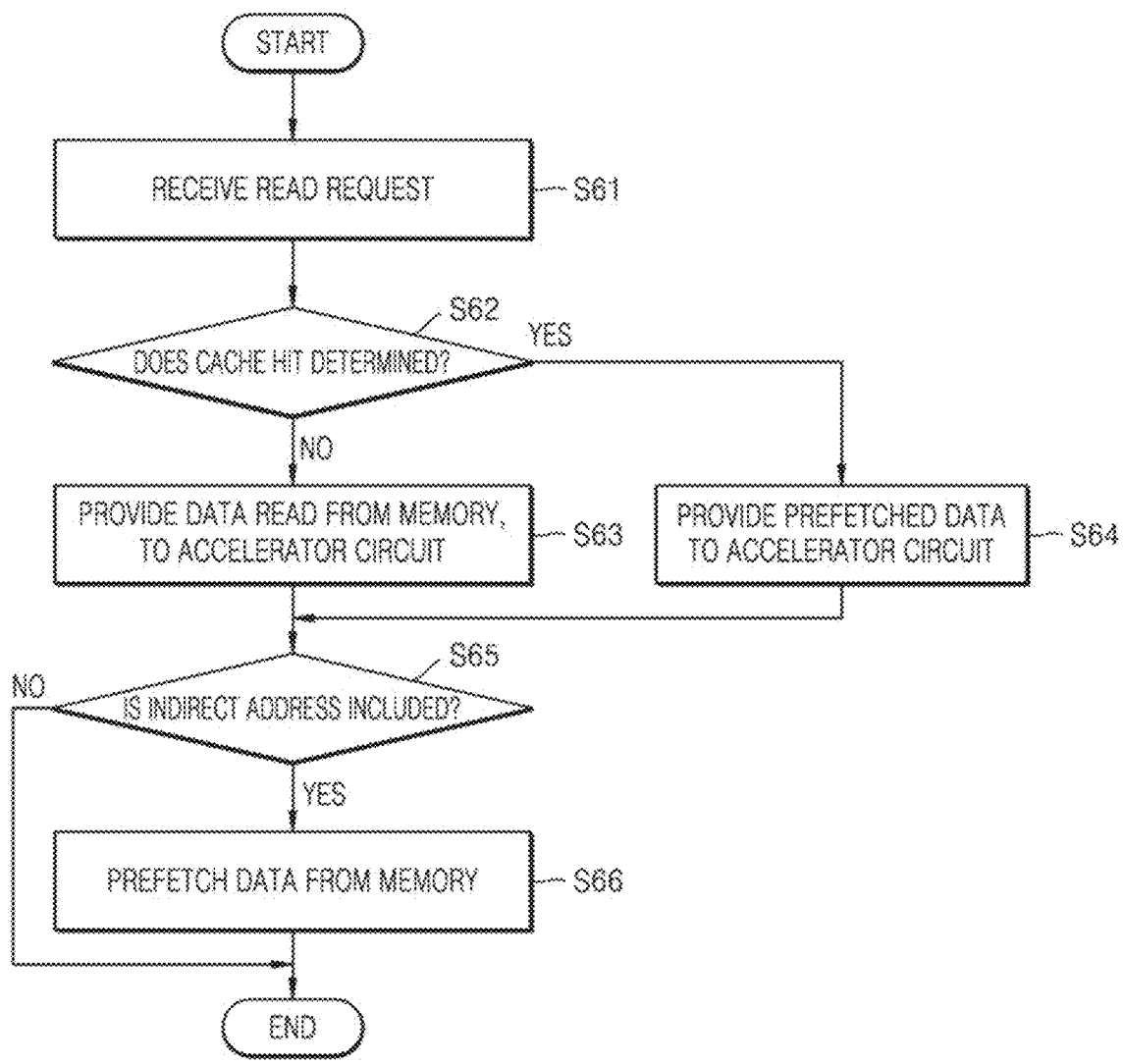
FIG. 6 is a flowchart of a method for indirect addressing according to an example embodiment.

FIG. 6 is a flowchart of a method for indirect addressing according to an example embodiment. In detail, the flowchart of FIG. 6 illustrates an example of an operation performed by a memory controller in response to a read request including an indirect address. As illustrated in FIG. 6, the method for indirect addressing may include a plurality of operations S61 through S66. In some embodiments, the method of FIG. 6 may be performed using the read circuit 543 of FIG. 5, and FIG. 6 will be described by referring to FIG. 5 below.

Referring to FIG. 6, a read request may be received in operation S61. For example, the read circuit 543 may receive a read request from the accelerator circuit 520 via the first interface circuit 541. As described above with reference to FIG. 2, the read request may include an address and information IND indicating that the address is an indirect address or information DIR indicating that the address is a direct address.

In operation S62, whether a cache hit has occurred may be determined. For example, the read circuit 543 may determine whether data corresponding to the address included in the read request received in operation S61 is prefetched or not. In some embodiments, the read circuit 543 may determine that a cache hit has occurred when the data is stored in the buffer 545. Also, when the data is stored in an upper-level memory included in the memory 560, the read circuit 543 may determine that a cache hit has occurred.

As illustrated in FIG. 6, when a cache miss, that is, a failure of a cache hit, is determined in operation S62, in operation S63, data read from the memory 560 may be provided to the accelerator circuit 520. For example, via the second interface circuit 542, the read circuit 543 may read data from a region of the memory 560 corresponding to the address included in the read request received in operation S61. The read circuit 543 may provide the read data to the accelerator circuit 520 via the first interface circuit 541. In some embodiments, the read circuit 543 may store the data read from the memory 560 in the buffer 545.

In operation S62, when a cache hit is determined, prefetched data may be provided to the accelerator circuit 520 in operation S64. For example, when prefetched data is stored in the buffer 545, the read circuit 543 may provide the data stored in the buffer 545 to the accelerator circuit 520 via the first interface circuit 541. Also, when prefetched data is stored in an upper-level memory of the memory 560, the read circuit 543 may read data from the memory 560 via the second interface circuit 542, and provide the read data to the accelerator circuit 520 via the first interface circuit 541. Accordingly, the accelerator circuit 520 may receive data earlier in operation S64 than when receiving data via operation S63.

In operation S65, whether the address included in the read request is an indirect address may be determined. For example, the read circuit 543 may determine whether the address included in the read request is an indirect address, based on information included in the read request received in operation S61. As illustrated in FIG. 6, when the read circuit 543 has identified that the address included in the read request is a direct address, because the data corresponding to the read request is provided to the accelerator circuit 520 in operation S63 or operation S64, the method of FIG. 6 may be ended.

In operation S65, when the address included in the read request is identified to be an indirect address, in operation S66, data may be prefetched from the memory 560. For example, when the address included in the read request received in operation S61 is an indirect address, the read circuit 543 may identify that the data provided to the accelerator circuit 520 in operation S63 or operation S64 is a direct address. Accordingly, the read circuit 543 may prefetch data from the memory 560 based on the data provided to the accelerator circuit 520 in operation S63 or operation S64, that is, the direct address. In some embodiments, the read circuit 543 may perform data prefetching by copying the data stored in a region of the memory 560 corresponding to the direct address to the buffer 545 via the second interface circuit 542. Also, in some embodiments, the read circuit 543 may perform data prefetching by copying data stored in a region of a lower-level memory corresponding to the direct address to an upper-level memory region in the memory 560.

Figure 7:
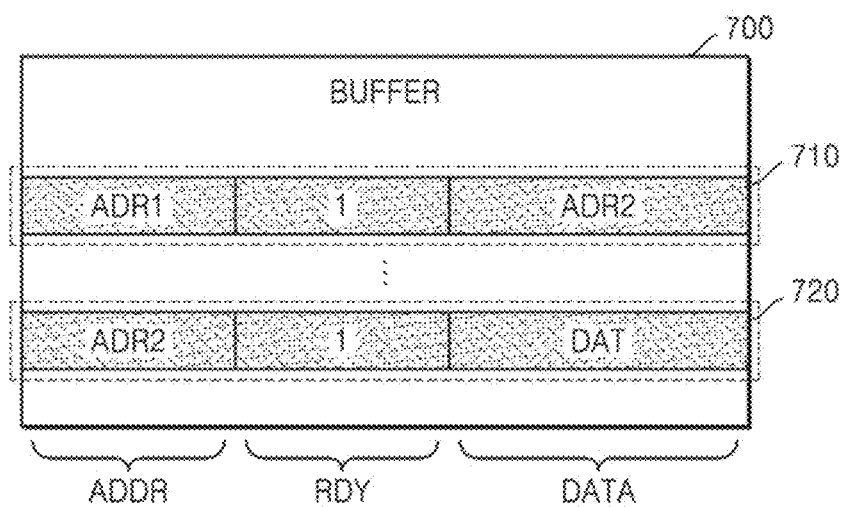
FIG. 7 is a block diagram illustrating a buffer according to an example embodiment.

FIG. 7 is a block diagram illustrating a buffer according to an example embodiment. In detail, a buffer 700 of FIG. 7 may be an example of the buffer 545 or may correspond to a state of a buffer included in the memory controller 220 after operation S27 is ended in FIG. 2. Hereinafter, FIG. 7 will be described by referring to FIGS. 2 and 5, and the buffer 545 of FIG. 5 is assumed to be the buffer 700 of FIG. 7.

In some embodiments, the read circuit 543 may use a portion of the buffer 700 as a memory for prefetching for a read operation (or a cache memory). For example, the read circuit 543 may read a second address ADR2 from the memory 560 in response to a first read request REQ1 including a first address ADR1, which is an indirect address, and store the second address ADR2 in the buffer 700. As illustrated in FIG. 7, the buffer 700 may store the first address ADR1 corresponding to a region in which the second address ADR2 is stored, as a first entry 710, together with the second address ADR2 read from the memory 560. Also, the read circuit 543 may read data DAT from the memory 560 based on the second address ADR2, which is a direct address, and store the data DAT in the buffer 700. As illustrated in FIG. 7, the buffer 700 may store, as a second entry 720, the second address ADR2 corresponding to a region in which the data DAT is stored, together with the data DAT read from the memory 560.

As illustrated in FIG. 7, entries stored in the buffer 700 may include an address field ADDR and a data field DATA, and may further include a ready field RDY. As described above, the data field DATA may correspond to data read from the memory 560, and the address field ADDR may correspond to an address of a region in which data of the data field DATA is stored. The ready field RDY may indicate whether data storage in the data field DATA of an entry is completed. For example, as illustrated in FIG. 7, as the first entry 710 and the second entry 720 respectively include the second address ADR2 and the data DAT, the first entry 710 and the second entry 720 may each have a value of "1" in the ready field RDY.

The read circuit 543 may determine that a cache hit has occurred based on whether an entry having an address identical to an address included in a read request is stored in the buffer 700. For example, the read circuit 543 may determine that a cache hit has occurred when receiving a read request including the second address ADR2 (e.g., REQ2 of FIG. 2), and may provide the data DAT included in the second entry 720 of the buffer 700 to the accelerator circuit 520. Also, as illustrated in FIG. 7, while the first entry 710 and the second entry 720 are stored in the buffer 700, when a read request including the first address ADR1 as an indirect address is received, the read circuit 543 may determine that a cache hit has occurred, and provide the second address ADR2 included in the first entry 710 of the buffer 700 to the accelerator circuit 520. Next, the read circuit 543 may determine a cache hit in reading based on the second address ADR2, and provide the data DAT included in the second entry 720 of the buffer 700 to the accelerator circuit 520.

In some embodiments, when reading data from the memory 560 by using a direct address read based on a direct address included in a read request received from the first interface circuit 541 or a direct address read based on an indirect address, the read circuit 543 may generate an entry including a corresponding address and store the entry in the buffer 700. Because data has not been read yet from the memory 560, the entry may have a value of "0" in the ready field RDY. When a read request including the address is received from the accelerator circuit 520 before reading of data is completed after the reading has been initiated by the read circuit 543, that is, when an entry including the above address has a value "0" in the ready field RDY, the read circuit 543 may determine that a cache hit has occurred, and may be on standby until data is received from the memory 560, instead of providing a new read command to the memory 560. For example, when the second read request REQ2 is received in operation S26 after operation S25 is performed in the example of FIG. 2, the memory controller 220 may determine a cache hit and be on standby for receiving the data DAT.

Figure 8:
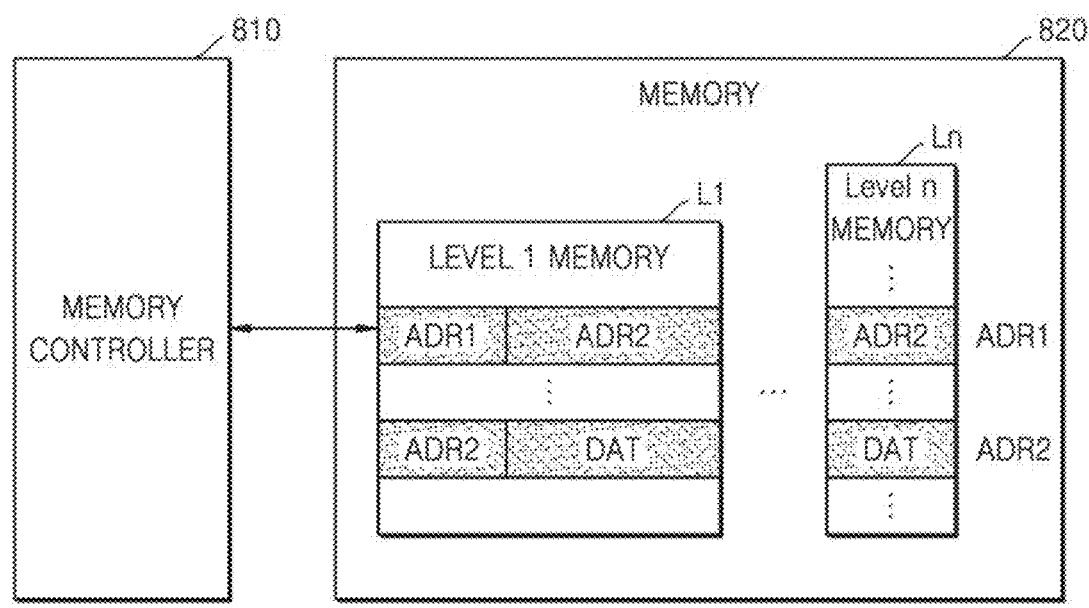
FIG. 8 illustrates a memory controller and a memory according to an example embodiment.

FIG. 8 illustrates a memory controller 810 and a memory 820 according to an example embodiment. In detail, the block diagram of FIG. 8 illustrates an exemplary structure of the memory 820 together with the memory controller 810, and the memory 820 may correspond to a state of the memory 230 after operation S27 is ended in FIG. 2.

In some embodiments, the memory 820 may have a hierarchical structure. For example, as illustrated in FIG. 8, the memory 820 may include a first level memory L1 through an nth level memory Ln (n is an integer greater than 1). The higher a level of a memory (for example, a memory closer to the first level memory L1), the memory may have a relatively small capacity and a higher response speed, whereas the lower a level of a memory (for example, a memory closer to the nth level memory Ln), the memory may have a relatively large capacity and a low response speed.

The memory controller 810 (or a read circuit included in the memory controller 810) may perform data prefetching by copying data stored in a lower-level memory to an upper-level memory. For example, as illustrated in FIG. 8, when reading the second address ADR2 in response to a read request including the first address ADR1, the memory controller 810 may copy the second address ADR2 from the nth level memory Ln to the first level memory L1, and store the first address ADR1 also in the first level memory L1. Also, when reading data DAT based on the second address ADR2, the memory controller 810 may copy the data DAT from the nth level memory Ln to the first level memory L1 and also store the second address ADR2 in the first level memory L1. Similar to the description provided with reference to FIG. 7, the memory controller 810 may determine whether a cache hit has occurred based on addresses stored in the first level memory L1.

Figure 9:
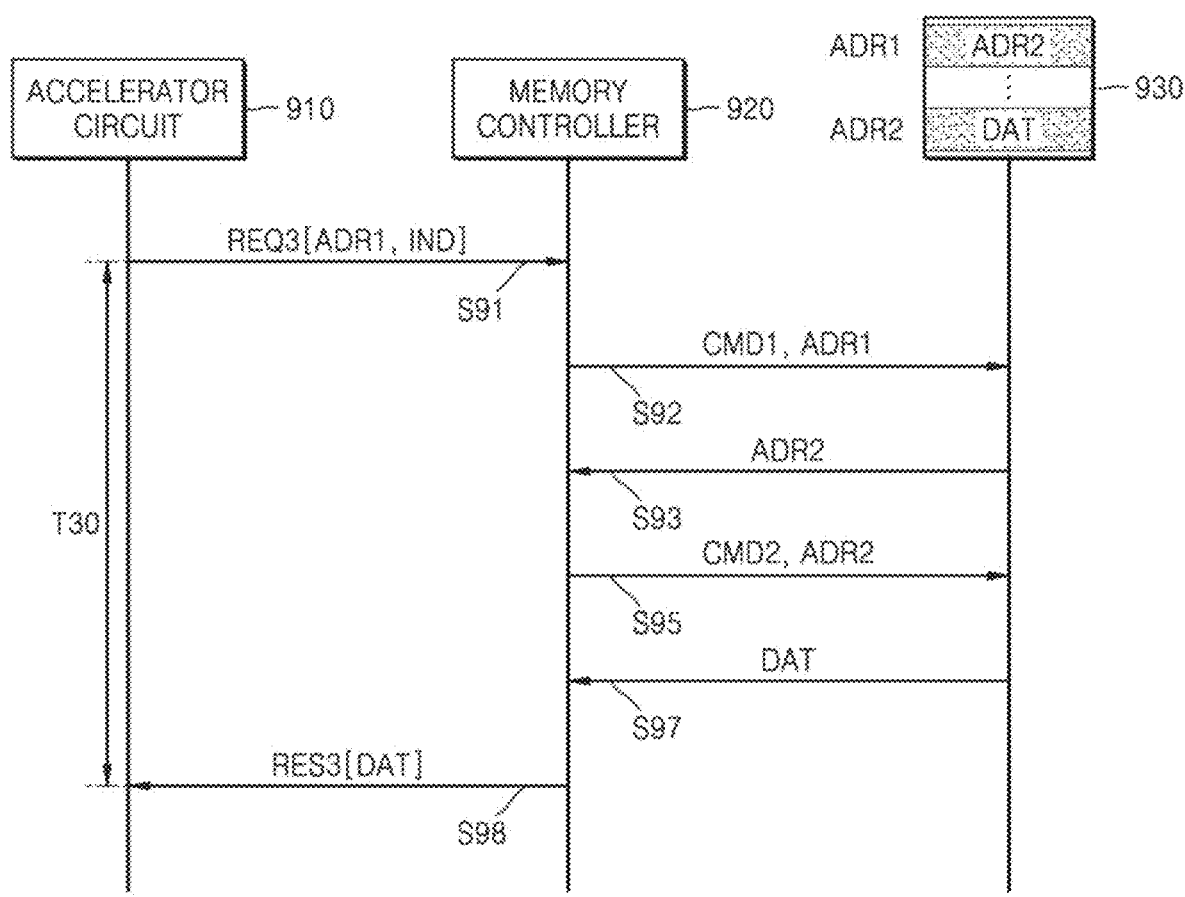
FIG. 9 is a message diagram illustrating a method for indirect addressing according to an example embodiment.

FIG. 9 is a message diagram illustrating a method for indirect addressing according to an example embodiment. In detail, FIG. 9 illustrates a message and/or data transmitted or received among an accelerator circuit 910, a memory controller 920, and a memory 930 with time. As illustrated in FIG. 9, the memory 930 is assumed to be storing a second address ADR2 in a region corresponding to a first address ADR1 and storing data DAT in a region corresponding to the second address ADR2.

Compared to the example of FIG. 2, when an indirect address is included in a read request, the memory controller 920 of FIG. 9 may read a direct address based on the indirect address and then provide data read based on the direct address to the accelerator circuit 910. For example, the memory controller 920 may provide a third response RES3 including the data DAT to the accelerator circuit 910 in response to a third read request REQ3 including the first address ADR1, which is an indirect address, and operations corresponding to operations S24 and S26 of FIG. 2 may be omitted. Accordingly, a total period of time taken by the accelerator circuit 910 to obtain the data DAT based on indirect addressing, that is, a time period T30 taken by the accelerator circuit 910 to issue the third read request REQ3 and then receive the third response RES3, may be longer than the time period T11 of FIG. 2 and shorter than the time period T10 of FIG. 2 (T11<T30<T10).

Referring to FIG. 9, in operation S91, the accelerator circuit 910 may provide the third read request REQ3 to the memory controller 920. As illustrated in FIG. 9, the third read request REQ3 may include the first address ADR1 and information IND indicating that the first address ADR1 is an indirect address.

In operation S92, the memory controller 920 may provide a first read command CMD1 and the first address ADR1 to the memory 930. For example, the memory controller 920 may extract the first address ADR1 from the third read request REQ3, and provide the first read command CMD1 to the memory 930 together with the first address ADR1.

In operation S93, the memory 930 may provide the second address ADR2 to the memory controller 920. For example, in response to the first read command CMD1, the memory 930 may identify the first address ADR1, and provide the second address ADR2 stored in a region corresponding to the first address ADR1, to the memory controller 920.

In operation S95, the memory controller 920 may provide a second read command CMD2 and the second address ADR2 to the memory 930. For example, the memory controller 920 may identify that the first address ADR1 included in the third read request REQ3 is an indirect address based on the information IND included in the third read request REQ3 received in operation S91. Similar to the description provided with reference to FIG. 2, also when no read request is issued by the accelerator circuit 910, the memory controller 920 may provide the second read command CMD2 to the memory 930, together with the second address ADR2 received from the memory 930 in operation S93.

In operation S97, the memory 930 may provide the data DAT to the memory controller 920. For example, in response to the second read command CMD2, the memory 930 may identify the second address ADR2, and provide the data DAT stored in a region corresponding to the second address ADR2, to the memory controller 920.

In operation S98, the memory controller 920 may provide the third response RES3 corresponding to the third read request REQ3, to the accelerator circuit 910. For example, as illustrated in FIG. 9, the memory controller 920 may provide the third response RES3 including the data DAT received from the memory 930 in operation S97, to the accelerator circuit 910. As described above, the memory controller 920 may provide not only the first read command CMD1 but also the second read command CMD2 to the memory 930 in response to the third read request REQ3, and may receive the data DAT at an early stage, and may thus provide the third response RES3 to the accelerator circuit 910 at an early stage.

In some embodiments, a read request including an indirect address may include information indicating whether a direct address is returned. For example, the accelerator circuit 910 may include information requesting return of a direct address (i.e., ADR2), in the first read request REQ1 of FIG. 2, and may include information requesting omission of return of a direct address, in the third read request REQ3 of FIG. 9. The memory controller 920 may provide or not provide a direct address read from the memory 930, that is, the second address ADR2, to the accelerator circuit 910, based on information included in a read request including an indirect address. That is, the first read request REQ1 of FIG. 2 and the third read request REQ3 of FIG. 9 may be supported both by the accelerator circuit 910 and the memory controller 920, and the first read request REQ1 and the third read request REQ3 may be distinguished from each other based on information included in a read request.

Figure 10:
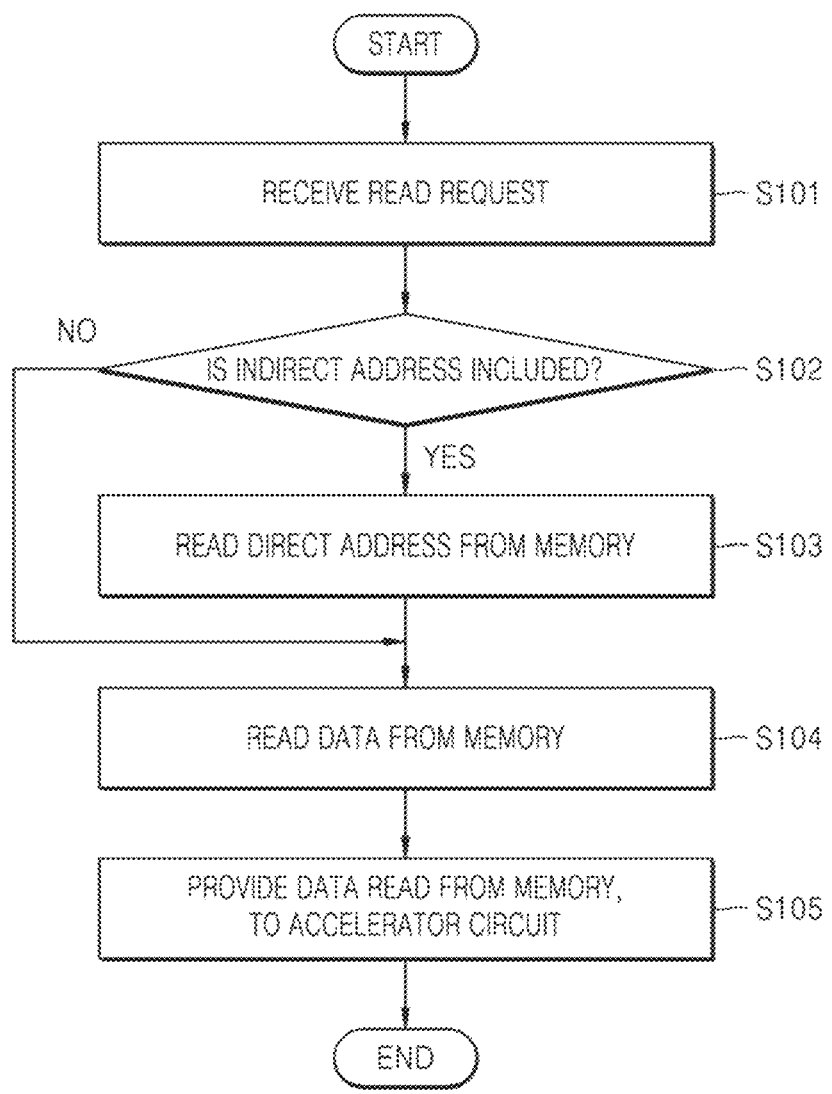
FIG. 10 is a flowchart of a method for indirect addressing according to an example embodiment.

FIG. 10 is a flowchart of a method for indirect addressing according to an example embodiment. In detail, the flowchart of FIG. 10 illustrates an example of an operation performed by a memory controller in response to a read request including an indirect address. As illustrated in FIG. 10, the method for indirect addressing may include a plurality of operations S101 through S105. In some embodiments, the method of FIG. 10 may be performed by using the memory controller 920 of FIG. 9 or a read circuit (e.g., 543 of FIG. 5) included in the memory controller 920, and FIG. 10 will be described below with reference to FIG. 9.

Referring to FIG. 10, a read request may be received in operation S101. For example, the memory controller 920 may receive a read request from the accelerator circuit 910. The read request may include an address, and may include information IND indicating that the address is an indirect address or information DIR indicating that the address is a direct address.

In operation S102, whether the address included in the read request is an indirect address may be determined. For example, the memory controller 920 may determine whether the address included in the read request is an indirect address, based on the information included in the read request received in operation S101. As illustrated in FIG. 10, when the memory controller 920 has identified that the address included in the read request is a direct address, operation S104 may be performed subsequently; when the memory controller 920 has identified that the address included in the read request is an indirect address, a direct address may be read from the memory 930 in operation S103. For example, the memory controller 920 may read a direct address from the memory 930 based on the indirect address included in the read request received in operation S101.

In operation S104, data may be read from the memory 930. For example, the memory controller 920 may read data from the memory 930 based on the direct address. When the direct address is identified in operation S102, the memory controller 920 may read data from the memory 930 based on the address included in the read request received in operation S101. When the indirect address is identified in operation S102, the memory controller 920 may read data from the memory 930 based on the direct address read in operation S103.

In operation S105, the data read from the memory 930 may be provided to the accelerator circuit 910. For example, the memory controller 920 may provide data to the accelerator circuit 910 as a response to the read request received in operation S101.

Figure 11A:
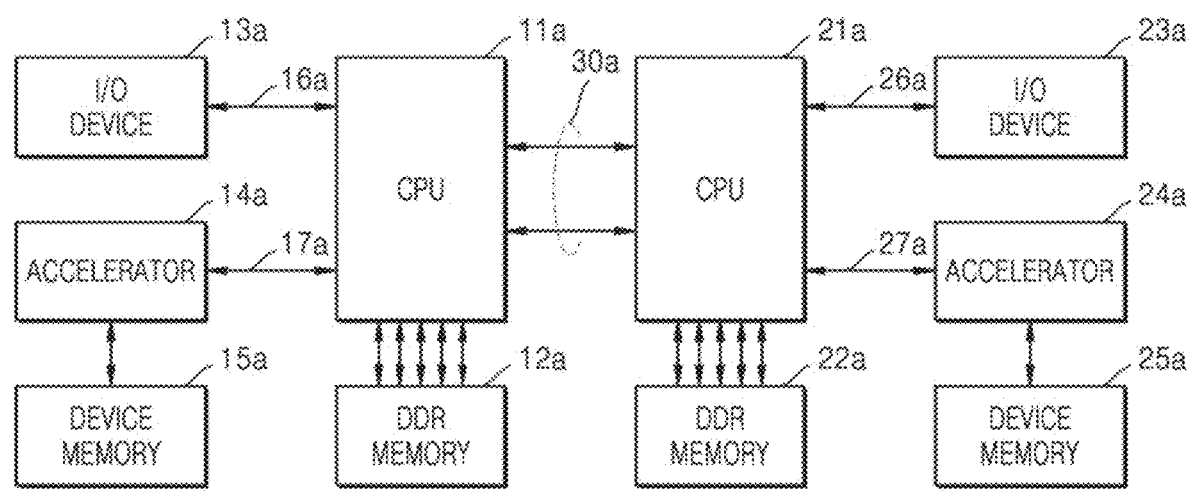
FIGS. 11A and 11B are diagrams illustrating examples of a system according to example embodiments.
Figure 11B:
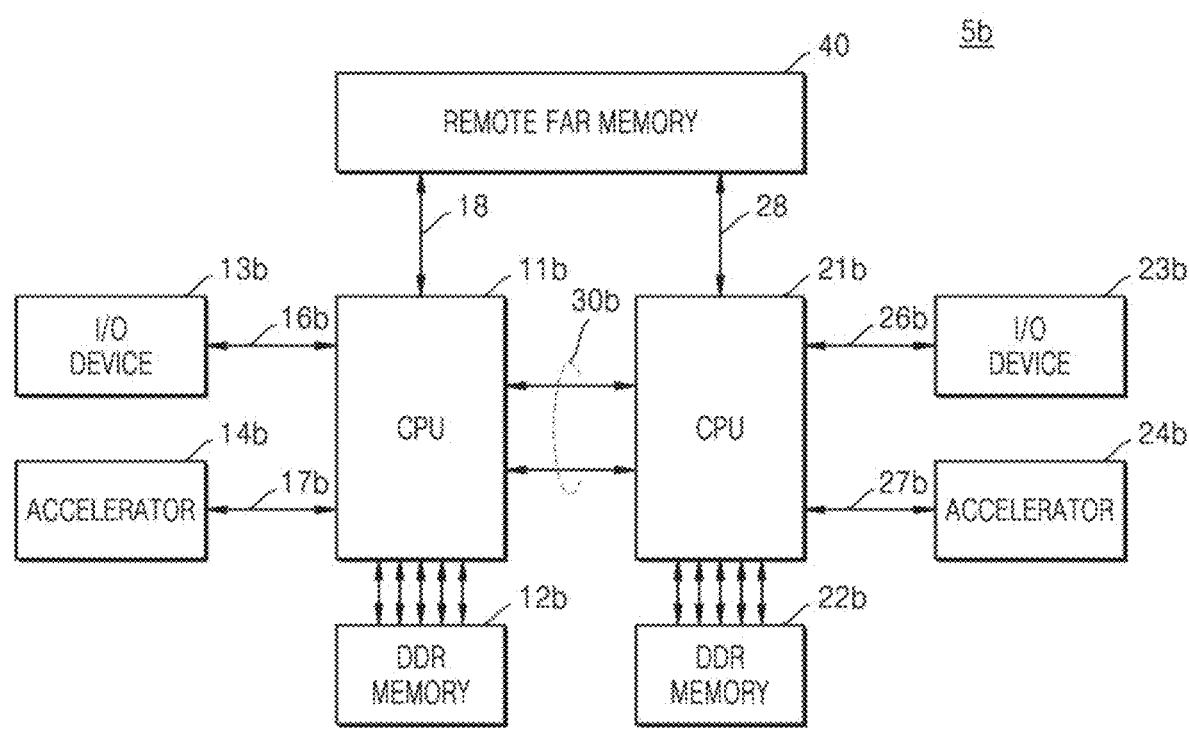

FIGS. 11A and 11B are diagrams illustrating examples of a system according to example embodiments. In detail, the block diagrams of FIGS. 11A and 11B respectively illustrate systems 5a and 5b including multiple CPUs. Hereinafter, description repeated between descriptions regarding FIGS. 11A and 11B will be omitted.

Referring to FIG. 11A, the system 5a may include first and second CPUs 11a and 21a and first and second double data rate (DDR) memories 12a and 22a respectively connected to the first and second CPUs 11a and 21a. The first and second CPUs 11a and 21a may be connected to each other via an interconnect system 30a based on processor interconnect technology. As illustrated in FIG. 11A, the interconnect system 30a may provide at least one CPU-to-CPU coherent link.

The system 5a may include a first input/output device 13a and a first accelerator 14a that communicate with the first CPU 11a, and include a first device memory 15a connected to the first accelerator 14a. The first CPU 11a and the first input/output device 13a may communicate with each other via a bus 16a, and the first CPU 11a and the first accelerator 14a may communicate with each other via a bus 17a. In addition, the system 5a may include a second input/output device 23a and a second accelerator 24a that communicate with the second CPU 21a, and include a second device memory 25a connected to the second accelerator 24a. The second CPU 21a and the second input/output device 23a may communicate with each other via a bus 26a, and the second CPU 21a and the second accelerator 24a may communicate with each other via a bus 27a.

Communication based on a protocol may be performed via the buses 16a, 17a, 26a, and 27a, and the protocol may support a read request including an indirect address described above with reference to the drawings. Accordingly, access latency with respect to a memory, for example, the first device memory 15a, the second device memory 25a, the first DDR memory 12a, and/or the second DDR memory 22a, may be reduced, and the performance of the system 5a may be improved.

Referring to FIG. 11B, similarly to the system 5a of FIG. 11A, the system 5b may include first and second CPUs 11b and 21b, first and second DDR memories 12b and 22b, first and second input/output devices 13b and 23b, and first and second accelerators 14b and 24b, and may further include a remote far memory 40. The first and second CPUs 11b and 21b may communicate with each other via an interconnect system 30b. The first CPU 11b may be connected to the first input/output devices 13b and the first accelerators 14b respectively via buses 16b and 17b, and the second CPU 21b may be connected to the second input/output devices 23b and the second accelerators 24b respectively via buses 26b and 27b.

The first and second CPUs 11b and 21b may be connected to the remote far memory 40 respectively via first and second buses 18 and 28. The remote far memory 40 may be used to extend a memory in the system 5b, and the first and second buses 18 and 28 may be used as a memory extension port. Not only protocols corresponding to the buses 16b, 17b, 26b, and 27b but also protocols corresponding to the first and second buses 18 and 28 may support the read request including an indirect address described above with reference to the drawings. Accordingly, access latency with respect to the remote far memory 40 may be reduced, and the performance of the system 5b may be improved.

Figure 12:
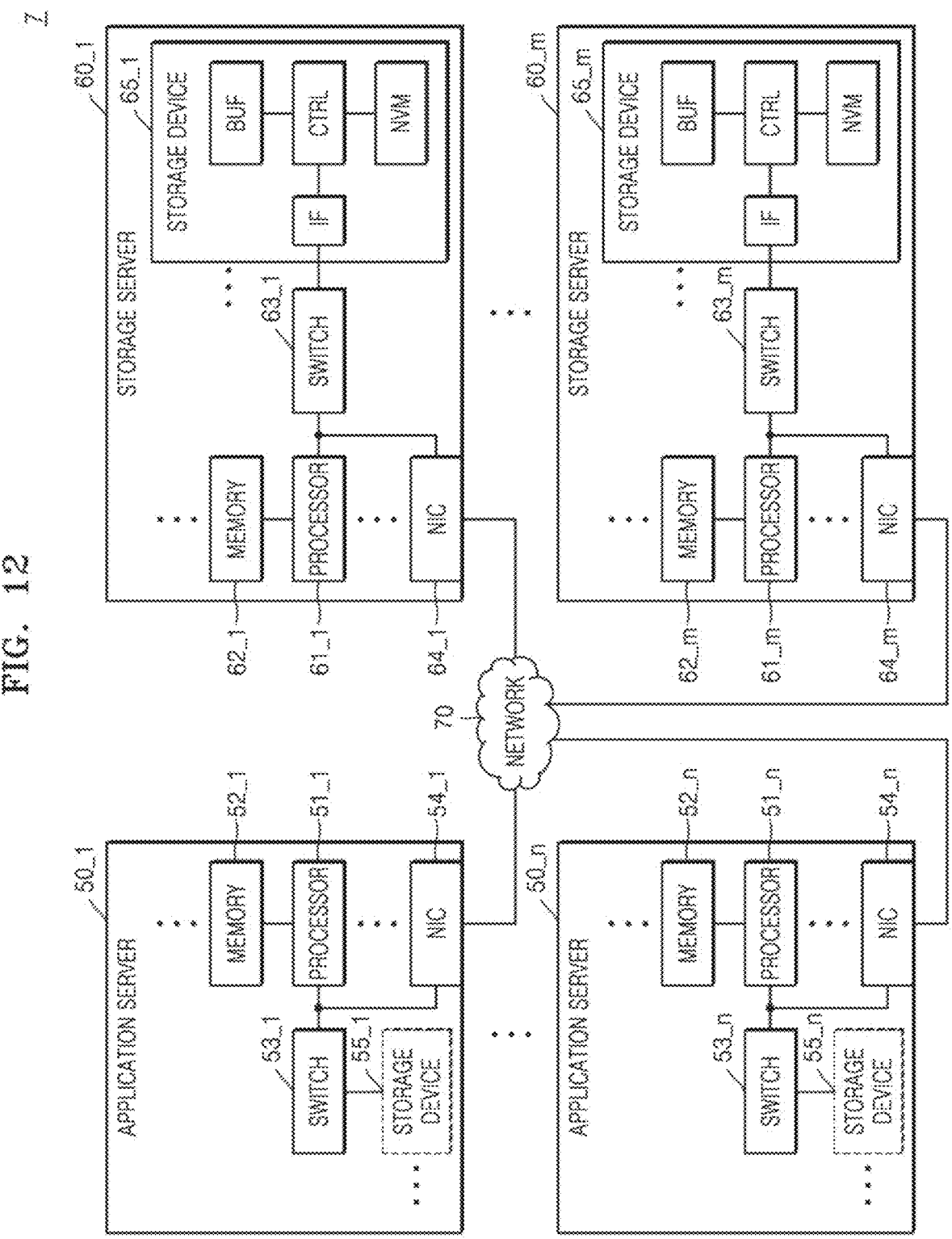
FIG. 12 is a block diagram illustrating a data center including a system according to an example embodiment.

FIG. 12 is a block diagram illustrating a data center 7 including a system according to an example embodiment. In some embodiments, the system described above with reference to the drawings may be included in the data center 7 as an application server and/or a storage server.

Referring to FIG. 12, the data center 7 may collect various data and provide services, and may also be referred to as a data storage center. For example, the data center 7 may be a system for operating a search engine and a database, or a computing system used by companies such as banks or government organizations. As illustrated in FIG. 12, the data center 7 may include application servers 50_1 through 50_n and storage servers 60_1 through 60_m (m and n are each an integer greater than 1). The number n of the application servers 50_1 through 50_n and the number m of the storage servers 60_1 through 60_m may be selected variously according to embodiments, and the number n of the application servers 50_1 through 50_n may be different from the number m of the storage servers 60_1 through 60_m (min).

The application server 50_1 or 50_n may include at least one of a processor 51_1 or 51_n, a memory 52_1 or 52_n, a switch 53_1 or 53_n, a network interface controller (NIC) 54_1 or 54_n, and a storage device 55_1 or 55_n. The processor 51_1 or 51_n may control overall operations of the application server 50_1 or 50_n, and access the memory 52_1 or 52_n to execute instructions and/or data loaded to the memory 52_1 or 52_n. The memory 52_1 or 52_n may include, as unlimited examples, a Double Data Rate Synchronous DRAM (DDR SDRAM), a High Bandwidth Memory (HBM), a Hybrid Memory Cube (HMC), a Dual In-line Memory Module (DIMM), Optane DIMM, or a Non-Volatile DIMM (NVNDIMM). According to embodiments, the number of processors and the number of memories included in the application server 50_1 or 50_n may be selected variously. In some embodiments, the processor 51_1 or 51_n and the memory 52_1 or 52_n may provide a processor-memory pair. In some embodiments, the number of the processors 51_1 through 51_n and that of the memories 52_1 through 52_n may be different from each other. The processor 51_1 or 51_n may include a single-core processor or a multi-core processor. In some embodiments, as marked by a dotted line in FIG. 12, the storage device 55_1 or 55_n may be omitted in the application server 50_1 or 50_n. The number of storage device 55_1 or 55_n included in the application server 50_1 or 50_n may be selected variously according to embodiments. The processor 51_1 or 51_n, the memory 52_1 or 52_n, the switch 53_1 or 53_n, the NIC 54_1 or 54_n, and/or the storage device 55_1 or 55_n may communicate with each other via the link described above with reference to the drawings.

The storage server 60_1 or 60_m may include at least one of a processor 61_1 or 61_m, a memory 62_1 or 62_m, a switch 63_1 or 63_m, an NIC 64_1 or 64_m, and a storage device 65_1 or 65_m. The processor 61_1 or 61_m and the memory 62_1 or 62_m may respectively operate in a similar manner to the processor 51_1 or 51_n and the memory 52_1 or 52_n of the application server 50_1 or 50_n described above.

The application servers 50_1 through 50_n and the storage servers 60_1 through 60_m may communicate with each other via a network 70. In some embodiments, the network 70 may be implemented using a Fibre Channel (FC) or Ethernet or the like. The FC may be a medium used in a relatively high-rate data transmission, and an optical switch providing high performance/high availability may be used. According to an access method of the network 70, the storage servers 60_1 through 60_m may be provided as a file storage, a block storage, or an object storage.

In some embodiments, the network 70 may be a storage-only network such as a Storage Area Network (SAN). For example, a SAN may use an FC network, and may be an FC-SAN implemented according to a FC Protocol (FCP). Alternatively, a SAN may be an IP-SAN that uses a TCP/IP network and is implemented according to an iSCSI (SCSI over TCP/IP or Internet SCSI) protocol. In some embodiments, the network 70 may be a general network such as a TCP/IP network. For example, the network 70 may be implemented according to a protocol such as an FC over Ethernet (FCoE), a Network Attached Storage (NAS), an NVMe over Fabrics (NVMe-oF), or the like.

While description will focus on the application server 50_1 and the storage server 60_1 below, it should be noted that description of the application server 50_1 may also apply to other application servers (e.g., 50_n), and description of the storage server 60_1 may also apply to other storage servers (e.g., 60_m).

The application server 50_1 may store data, the storage of which is requested by a user or a client, in one of the storage servers 60_1 through 60_m via the network 70. In addition, the application server 50_1 may obtain data, the reading of which is requested by a user or a client, from one of the storage servers 60_1 through 60_m via the network 70. For example, the application server 50_1 may be implemented using a web server or a Database Management System (DBMS) or the like.

The application server 50_1 may access the memory 52_n and/or the storage device 55_n included in another application server 50_n via the network 70, and/or access the memories 62_1 through 62_m and/or the storage devices 65_1 through 65_m included in the storage servers 60_1 through 60_m via the network 70. Accordingly, the application server 50_1 may perform various operations on data stored in the application servers 50_1 through 50_n and/or the storage servers 60_1 through 60_m. For example, the application server 50_1 may execute an instruction for moving or copying data between the application servers 50_1 through 50_n and/or the storage servers 60_1 through 60_m. The data may be moved from the storage devices 65_1 through 65_m of the storage servers 60_1 through 60_m to the memories 52_1 through 52_n of the application servers 50_1 through 50_n via the memories 62_1 through 62_m of the storage servers 60_1 through 60_m or directly. In some embodiments, data moved via the network 70 may be data encoded for security or privacy.

In the storage server 60_1, an interface IF may provide a physical connection between the processor 61_1 and a controller CTRL and a physical connection between the NIC 64_1 and the controller CTRL. For example, the interface IF may be implemented using a Direct Attached Storage (DAS) method in which the storage device 65_1 is directly accessed using a dedicated cable. Also, for example, the interface IF may be implemented using various interface methods such as Advanced Technology Attachment (ATA), Serial ATA (SATA), external SATA (e-SATA), Small Computer System Interface (SCSI), Serial Attached SCSI (SAS), Peripheral Component Interconnection (PCI), PCI express (PCIe), NVM express (NVMe), IEEE 1394, universal serial bus (USB), a secure digital (SD) card, a multi-media card (MMC), an embedded multi-media card (eMMC), Universal Flash Storage (UFS), embedded Universal Flash Storage (eUFS), or a compact flash (CF) card interface.

In the storage server 60_1, according to the control by the processor 61_1, the switch 63_1 may allow the processor 61_1 and the storage device 65_1 to selectively connect to each other, and allow the NIC 64_1 and the storage device 65_1 to selectively connect to each other.

In some embodiments, the NIC 64_1 may include a network interface card, a network adapter, or the like. The NIC 64_1 may be connected to the network 70 via a wired interface, a wireless interface, a Bluetooth interface, an optical interface, or the like. The NIC 64_1 may include an internal memory, a digital signal processor (DSP), a host bus interface, or the like, and may be connected to the processor 61_1 and/or the switch 63_1 via the host bus interface. In some embodiments, the NIC 64_1 may be integrated with at least one of the processor 61_1, the switch 63_1, and the storage device 65_1.

In the application servers 50_1 through 50_n or the storage servers 60_1 through 60_m, the processors 51_1 through 51_m or 61_1 through 61_n may transmit a command to the storage devices 55_1 through 55_n or 65_1 through 65_m or the memories 52_1 through 52_n or 62_1 through 62_m to program or read data. The data may be error-corrected data corrected using an error correction code (ECC) engine. The data may be data on which data bus inversion (DBI) or data mask (DM) is performed, and may include cyclic redundancy code (CRC) information. The data may be encoded for security or privacy.

In response to a read command received from the processors 51_1 through 51_m or 61_1 through 61_n, the storage devices 55_1 through 55_n or 65_1 through 65_m may transmit a control signal and a command/address signal to a nonvolatile memory device (for example, a NAND flash memory device NVM. Accordingly, when reading data from the nonvolatile memory device NVM, a read enable signal may be input as a data output control signal to output data to a DQ bus. By using the read enable signal, a data strobe signal may be generated. A command and an address signal may be latched according to a rising edge or a falling edge of a write enable signal.

The controller CTRL may control overall operations of the storage device 65_1. In an embodiment, the controller CTRL may include a static random access memory (SRAM). The controller CTRL may write data to the nonvolatile memory device NVM in response to a write command, or read data from the nonvolatile memory device NVM in response to a read command. For example, a write command and/or a read command may be generated based on a request provided by a host, for example, the processor 61_1 in the storage server 60_1, the processor 61_m in another storage server 60_m, or the processor 51_1 or 51_n in the application server 50_1 or 50_n. A buffer BUF may temporarily store (buffering) data to be written to the nonvolatile memory device NVM or data read from the nonvolatile memory device NVM. In some embodiments, the buffer BUF may include a DRAM. Also, the buffer BUF may store metadata, and the metadata may refer to user data or data generated in the controller CTRL to control the nonvolatile memory device NVM. The storage device 65_1 may include a secure element (SE) for security or privacy.

While embodiments have been particularly shown and described, it will be understood that various changes in form and details may be made therein without departing from the spirit and scope of the following claims.

What is claimed is:

1. A memory controller configured to control a memory accessed by a device connected to a host processor via a bus, wherein the device comprises an accelerator circuit, the memory controller comprising:
   a first interface circuit configured to communicate with the device;
   a second interface circuit configured to communicate with the memory;
   a write circuit configured to store first data in the memory based on indirect addressing; and
   a read circuit configured to:
      identify that a first address included in a first read request received via the first interface circuit from the accelerator circuit is an indirect address of the first data, based on first information included in the first read request,
      read a second address from a first region of the memory via the second interface circuit, the first region corresponding to the first address,
      in response to the first read request, provide the second address to the accelerator circuit of the device via the first interface circuit, and
      prefetch the first data from a second region of the memory via the second interface circuit, the second region corresponding to the second address,
   wherein the read circuit is further configured to perform the prefetch by providing a second read command to the memory, together with the second address, without an additional read request issued with respect to the first read request by the accelerator circuit.

2. The memory controller of claim 1, wherein the read circuit is further configured to:
   identify that the second address included in a second read request received via the first interface circuit is a direct address of the first data, based on second information included in the second read request, and
   provide the first data to the device via the first interface circuit in response to the second read request, and
   wherein the first data is provided to the device in response to the second read request without an additional access to the memory, thereby providing the first data at an early stage.

3. The memory controller of claim 2, further comprising a buffer configured to store a copy of the first data,
   wherein the read circuit is further configured to provide the copy of the first data stored in the buffer to the device via the first interface circuit based on the second address included in the second read request.

4. The memory controller of claim 3, wherein the buffer is further configured to further store the second address.

5. The memory controller of claim 3, wherein the buffer is further configured to store ready information indicating whether the copy of the first data stored in the buffer is valid, and
   wherein the read circuit is further configured to, in response to the second read request and according to the ready information:
   provide the copy of the first data stored in the buffer via the first interface circuit to the device, or
   wait until the first data stored in the second region of the memory is completely loaded into the buffer, and then provide the copy of the first data stored in the buffer via the first interface circuit to the device.

6. The memory controller of claim 1, wherein the read circuit is further configured to provide the first data to the device via the first interface circuit in response to the first read request.

7. The memory controller of claim 1, wherein the first interface circuit is further configured to communicate with the device based on a protocol of the bus.

8. The memory controller of claim 1, wherein the memory is included in a device memory that is attached to the device and accessible by the host processor via the device.

9. The memory controller of claim 1, wherein the first read request comprises information indicating that the first address is the indirect address.

10. A system comprising:
    a host processor comprising at least one core configured to execute instructions;
    a device connected to the host processor via a bus and comprising an accelerator circuit and a memory controller; and
    a memory configured to be accessed by the accelerator circuit via the memory controller,
    wherein the accelerator circuit is configured to store first data in the memory based on indirect addressing,
    wherein the accelerator circuit is further configured to provide a first read request including an indirect address of the first data stored in the memory, to the memory controller,
    wherein the memory controller is further configured to:
    identify the indirect address of the first data based on first information included in the first read request,
    read a direct address of the first data from a first region of the memory corresponding to the indirect address of the first data,
    provide the direct address to the accelerator circuit in response to the first read request, and
    prefetch the first data from a second region of the memory corresponding to the direct address, and
    wherein the memory controller is further configured to perform the prefetch by providing a second read command to the memory, together with the direct address, without an additional read request issued with respect to the first read request by the accelerator circuit.

11. The system of claim 10, wherein the accelerator circuit is further configured to provide a second read request including the direct address to the memory controller, and receive the first data from the memory controller.

12. The system of claim 11, wherein the memory controller comprises a buffer configured to store a copy of the first data, and
    wherein the memory controller is further configured to identify the direct address based on second information included in the second read request, and provide the copy of the first data stored in the buffer to the accelerator circuit in response to the second read request.

13. The system of claim 10, wherein the memory comprises an upper-level memory and a lower-level memory, and
    the memory controller is further configured to prefetch the first data by copying data stored in the lower-level memory to the upper-level memory.

14. The system of claim 10, wherein the memory is attached to the device and accessible by the host processor via the device.

15. A method performed by a device connected to a host processor via a bus, wherein the device comprises an accelerator circuit, the method comprising:
storing first data in a memory based on indirect addressing
providing, by the accelerator circuit to the memory, a first read request including a first address;
receiving, by the accelerator circuit from the memory in response to the first read request, a second address stored in a first region of the memory corresponding to the first address;
providing, to the memory, a second read request including the second address; and
receiving, from the memory, the first data stored in a second region of the memory corresponding to the second address,
wherein the first read request further includes first information indicating that the first address is an indirect address of the first data, and
wherein a second period of time taken from the providing of the second read request to the receiving of the first data is shorter than a first period of time taken from the providing of the first read request to the receiving of the second address.

16. The method of claim 15, wherein the second read request further includes second information indicating that the second address is a direct address of the first data.

17. The method of claim 15, further comprising:
providing a third read request including a third address to the memory; and
receiving, from the memory, second data stored in a fourth region of the memory, the fourth region corresponding to a fourth address stored in a third region of the memory corresponding to the third address,
wherein the third read request further includes third information indicating that the third address is an indirect address of the second data and fourth information indicating omission of receiving of the fourth address.

18. The method of claim 17, wherein a third period of time taken from the providing of the third read request to the receiving of the second data is longer than the first period of time taken from the providing of the first read request to the receiving of the second address and the third period of time is shorter than a fourth period of time from the providing of the first read request to the receiving of the first data.

* * * * *